(12) United States Patent
Subbotin et al.

(10) Patent No.: US 8,122,857 B2
(45) Date of Patent: Feb. 28, 2012

(54) CONTROL ARCHITECTURE AND OPTIMAL STRATEGY FOR SWITCHING BETWEEN 2-STROKE AND 4-STROKE MODES OF HCCI OPERATION

(75) Inventors: Maksim Subbotin, Goleta, CA (US); Sungbae Park, Cupertino, CA (US); Jasim Ahmed, Mountain View, CA (US); Aleksandar Kojic, Sunnyvale, CA (US); Nalin Chaturvedi, Sunnyvale, CA (US); David Cook, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 480 days.

(21) Appl. No.: 12/387,668

(22) Filed: May 4, 2009

(65) Prior Publication Data

US 2010/0275860 A1    Nov. 4, 2010

(51) Int. Cl.
  *F02B 69/06*    (2006.01)
(52) U.S. Cl. .......................................... 123/21; 701/101
(58) Field of Classification Search .................... 123/21; 701/121
  See application file for complete search history.

(56) References Cited

U.S. PATENT DOCUMENTS

| 5,113,805 | A  | * | 5/1992 | Kawamura | 123/21 |
| 7,047,910 | B2 | * | 5/2006 | Hedman | 123/21 |
| 7,082,898 | B2 | * | 8/2006 | Kitamura et al. | 123/21 |
| 7,231,892 | B2 | * | 6/2007 | Kojic et al. | 123/21 |
| 2004/0244732 | A1 | * | 12/2004 | Kojic et al. | 123/21 |
| 2007/0012265 | A1 | * | 1/2007 | Lewis et al. | 123/21 |
| 2009/0048756 | A1 | * | 2/2009 | Park et al. | 701/101 |

OTHER PUBLICATIONS

Chiang, C.J., & Stefanopoulou, A.G. (2006). Sensitivity analysis of combustion timing and duration of homogeneous charge compression ignition (HCCI) engines,In Proc. of American Control Conference, (pp. 1857-1862).

Fiveland, F.B., & Assanis, D.N. A quasi-dimensional HCCI model for performance and emission studies. In Proc. of the 9$^{th}$ Int. Conf. on Numerical Combustion, No. MS052.

Knierim, K.L. (2007). Modeling and control of HCCI combustion, Diploma Thesis, Institute of Applied and Experimental Mechanics, University of Stuttgart.

Koopmans, L., Backlund, O., & Denbratt, I. (2002). Cycle to cycle variations: their influence on cycle resolved gas temperature and unburned hydrocarbons from a camless gasoline compression ignition engine, SAE 200-01-0110.

(Continued)

*Primary Examiner* — Michael Cuff
*Assistant Examiner* — Long T Tran
(74) *Attorney, Agent, or Firm* — Kenyon & Kenyon LLP

(57) ABSTRACT

Engine correction inputs to control oscillation in an engine output in a transition between 2-stroke and 4-stroke engine cycle modes of an HCCI engine are determined as follows: for each mode, valve timings which modify the engine output the most upon switching are determined, and a linear engine system model is defined at least partially based on the determined valve timings, which model provides mappings relating initial conditions of the engine and the engine correction inputs to outputs of the engine; initial conditions of the engine corresponding to a switching point for switching between the two modes are determined; desired engine output conditions upon switching between the two modes are specified; and the engine correction inputs are determined by using the determined initial conditions, the desired engine output conditions, and the linear engine system model corresponding to the engine cycle mode in effect upon switching.

6 Claims, 4 Drawing Sheets

OTHER PUBLICATIONS

Marriott, C., Kong, S.C., & Reitz, R.D. (2002). Investigation of Hydrocarbon emissions from a direct injection-gasoline premixed charge compression ignited engine, SAE 2002-01-0419.

Martinez-Frias, J., Aceves, S.M., Flowers, D., Smith, J.R., & Dibble, R. (2000). HCCI engine control by thermal management, SAE 2000-01-2869.

Milovanovic, N. et al. (2005). SI-HCCI-SI mode transition at different engine operating conditions, SAE 2005-01-0156.

Haraldson, G., Johanson, B. (2005). Operating conditions using spark assisted HCCI combustion during combustion mode transfer to SI in a multi-cylinder VCR-HCCI engine, SAE 2005-01-0109.

Shaver, G.M., Gerdes, J.C., Jain, P., Caton, P.A., & Edwards, C.F. (2003). Modeling for control of HCCI engines. In Proc. of American Control Conference, (pp. 749-754).

Shaver, G.M., Roelle, M., & Gerdes, J.C. (2006). A two-input two-output control model of HCCI engines. In Proc. of American Control Conference, (pp. 472-477).

Subbotin, M.V., Knierim, K.L., Park, S., Kojic, A., Ahmed, J. (2008). Modeling and control of a two stroke HCCI engine, In Proc. of American Control Conference.

Tunestal, P., Olsson, J.O., & Johansson, B. (2001). HCCI operation of a multi-cylinder engine, First Biennial Meeting of the Scandinavian-Nerdic section of the Combustion Institute.

* cited by examiner

CONTROL ARCHITECTURE AND OPTIMAL STRATEGY FOR SWITCHING BETWEEN 2-STROKE AND 4-STROKE MODES OF HCCI OPERATION

BACKGROUND OF THE INVENTION

1. Field of Invention

The present invention relates to a control system and method for controlling switching between 2-stroke and 4-stroke modes of Homogeneous Charge Compression Ignition (HCCI) engine.

2. Description of Related Art

Homogeneous Charge Compression Ignition (HCCI) technology provides an improvement in efficiency and significant reduction in emissions in comparison to Spark Ignition (SI) and Compression Ignition (CI) internal combustion technologies. The improved fuel economy of the HCCI engines is explained by a high dilution of charge and low throttling losses, which simultaneously results in lower Carbon Monoxide (CO) emissions. In addition, the HCCI engine achieves reduction of Nitrous Oxides ($NO_x$) emissions by about two orders of magnitude in comparison to conventional SI and CI diesel engines, which reduction results from much lower combustion temperatures due to the high dilution of fresh charge.

One of the main challenges in implementing the HCCI regime is an initiation of the homogeneous combustion. Unlike the SI or CI engines in which combustion is initiated with spark or fuel injection, the HCCI engine lacks a specific event initiating combustion. The auto ignition of a premixed charge in the cylinder is achieved by controlling concentrations of the mixture components and their temperature at the beginning of a combustion stroke. Two main approaches for control of the mixture temperature are a heating or precompressing of an intake charge and reinduction or trapping exhaust gasses from the previous cycle. The latter approach results in higher overall efficiency and is implemented using active valve control system regulating valve timing.

The high dilution of a fresh charge with exhaust gasses in the engine cylinder is required to increase temperature at the beginning of the combustion stroke. However, the dilution results in a limited work output of the HCCI engine in comparison to SI and CI engines. Several methods are introduced to overcome this limitation. One of the methods employs a hybrid switching strategy which involves switching between HCCI and standard SI modes. When the load is low, the engine can operate in a highly efficient HCCI mode; when a higher output is required, the engine switches to the SI mode, though this means the advantages of the HCCI are lost. Another alternative, which allows the engine to operate in the broad range of loads, is a hybrid strategy involving switching between 4-stroke and 2-stroke HCCI modes. This method allows harvesting the efficiency and emission advantages of the HCCI technology without limiting of the load range. In addition, switching between the two HCCI modes is potentially simpler to implement than switching between 4-stroke HCCI and SI modes. The main idea of this approach is to use the 4-stroke HCCI mode at low loads and switch to the 2-stroke mode at high loads to double the number of combustion events per engine revolution while preserving all the advantages of the HCCI technology.

A BRIEF SUMMARY OF THE INVENTION

An objective of the present invention is to provide a control system and a method for calculating control inputs which ensure a smooth transition between the 2-stroke and the 4-stroke HCCI modes during switching. In the present specification, "control inputs" are to be understood as the timings for opening and closing of intake and exhaust valves. Variables which have to be controlled during normal engine operation in one of the HCCI modes and during the switching between the modes are an Integrated Mean Effective Pressure (IMEP) and a combustion phasing.

In accordance with the present invention, it is provided that the switching between the 2-stroke and the 4-stroke HCCI modes (or vice versa) is controlled by a logic, e.g., a computer program, which triggers the engine to switch from one mode to another depending on the desired engine output. In accordance with an example embodiment of the present invention, the engine is controlled so as to switch between the 2-stroke and the 4-stroke modes at the output in IMEP approximately equal to 4 bar. The combustion phasing in both the 2-stroke and the 4-stroke HCCI modes, as well as during switching, is regulated to 7 degrees TDC and is measured at a middle point of the combustion reaction (denoted in FIG. 1 as "MFB50").

A BRIEF DESCRIPTION OF THE SEVERAL VIEWS OF THE DRAWING

Figure 3:
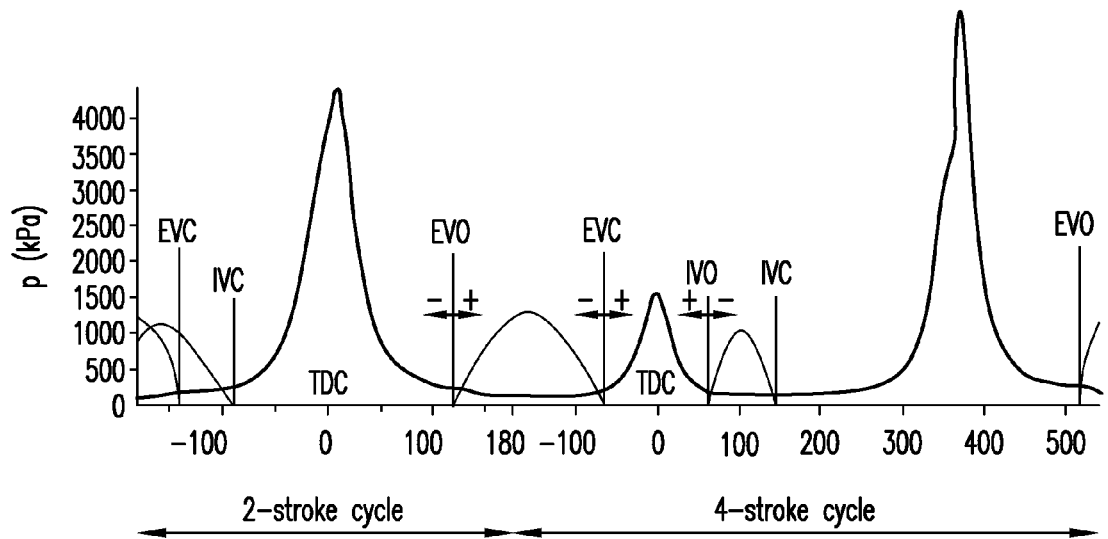

FIG. 3 shows characteristic pressure trace for last 2-stroke cycle and first 4-stroke cycle in switching from the 2-stroke mode to the 4-stroke mode.

Figure 4:
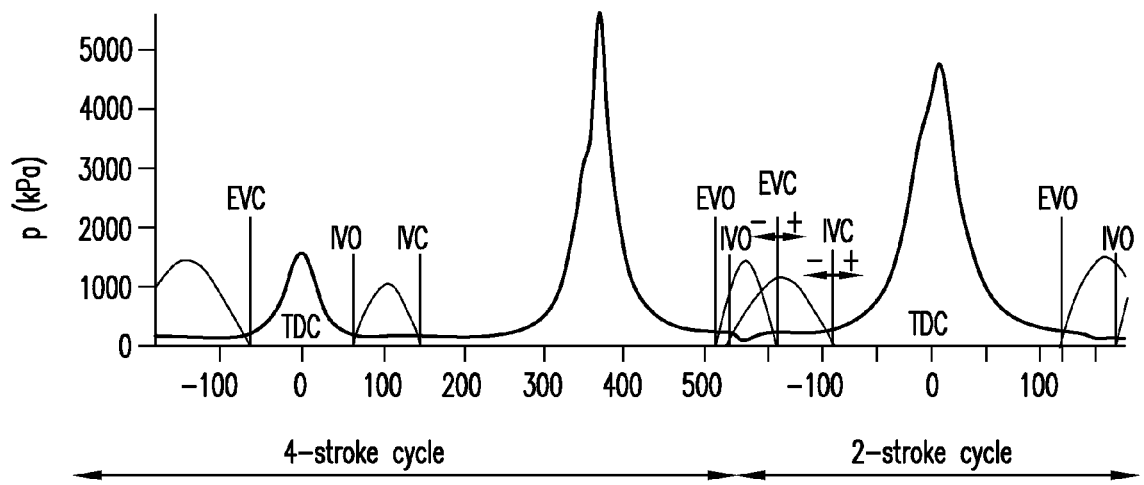

FIG. 4 shows characteristic pressure trace for last 4-stroke cycle and first 2-stroke cycle in switching from the 4-stroke mode to the 2-stroke mode.

Figure 5:
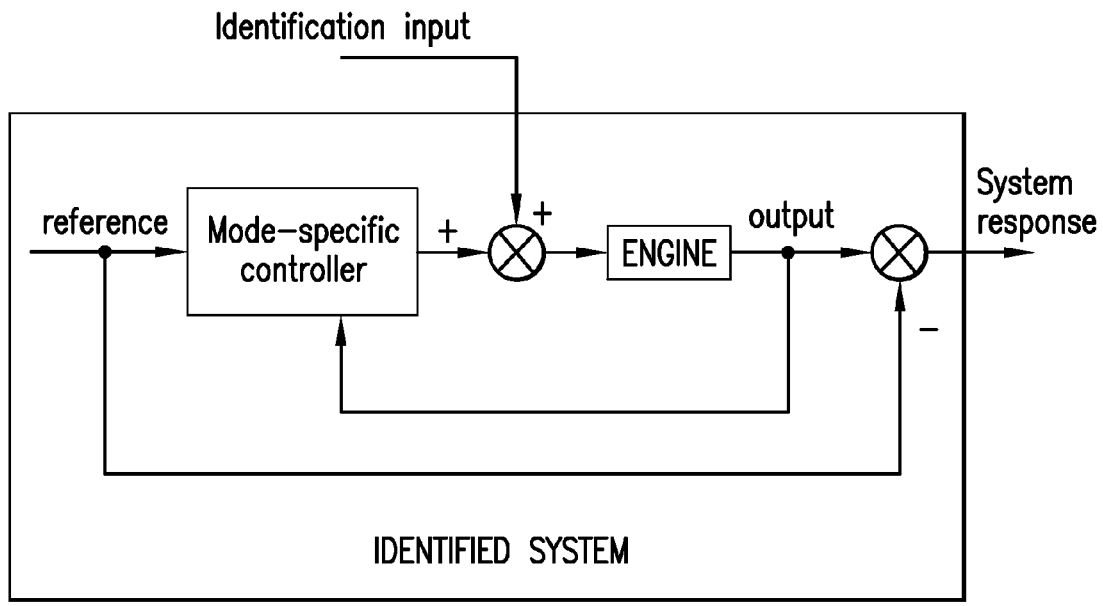

FIG. 5 shows a schematic block diagram illustrating an example identification structure for identifying system models according to the present invention.

Figure 6:
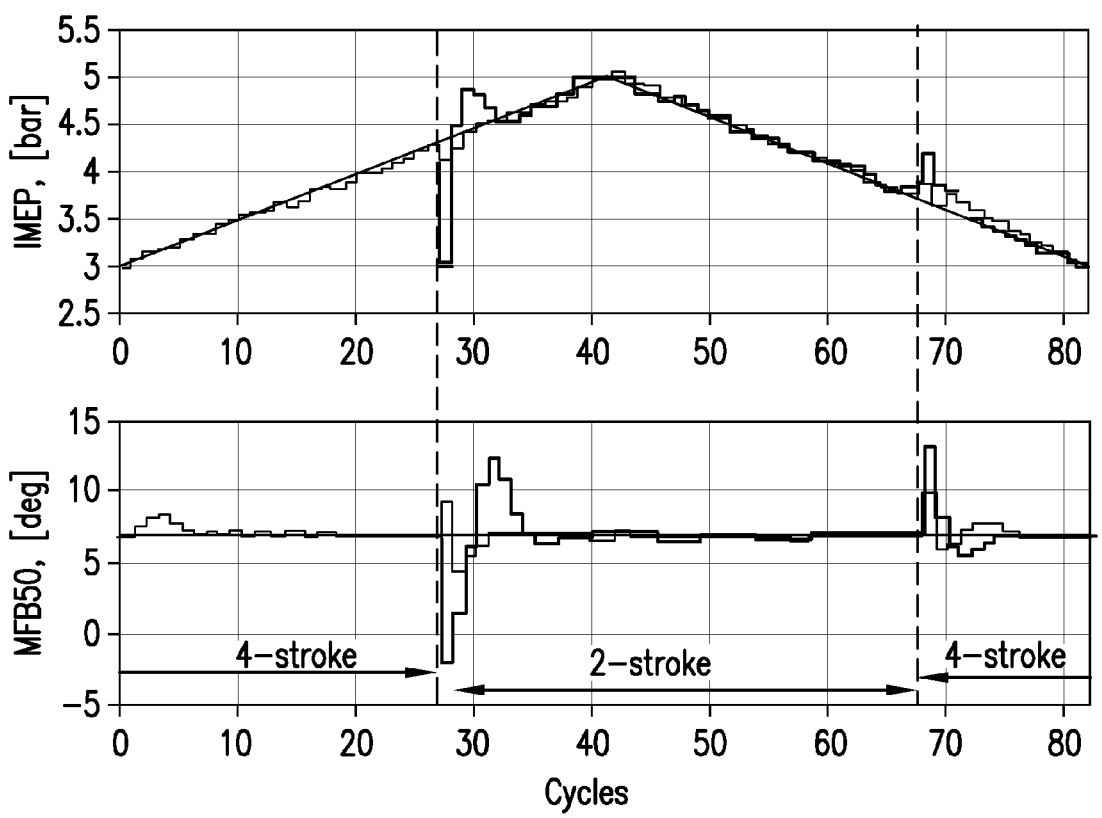

FIG. 6 shows comparison between corrected and uncorrected outputs in IMEP and combustion phasing for the full nonlinear model.

Figure 7:
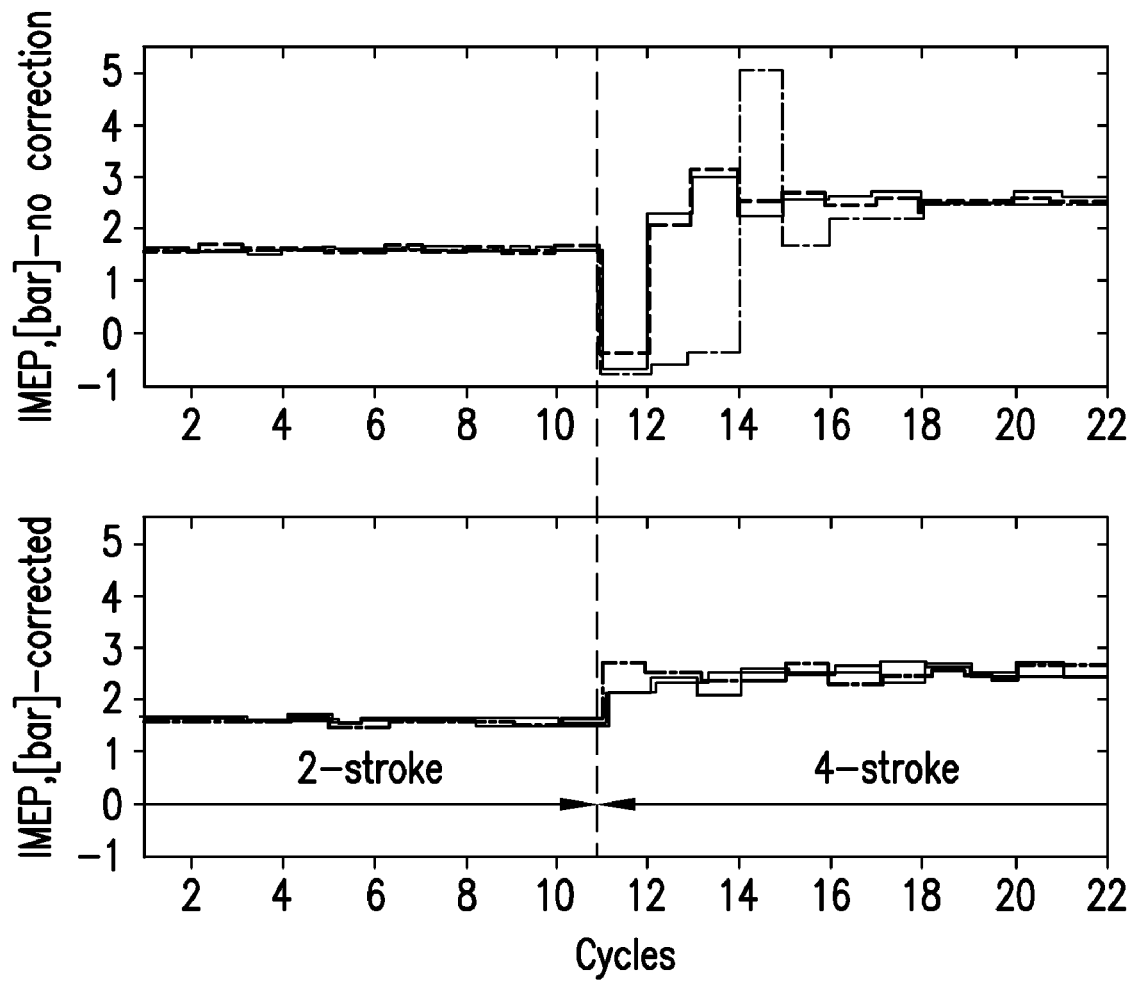

FIG. 7 shows comparison of engine outputs in IMEP recorded during three experiments for the corrected switching (lower chart) and uncorrected switching (upper chart) from 2-stroke to 4-stroke mode.

DETAILED DESCRIPTION OF THE INVENTION

Figure 1:
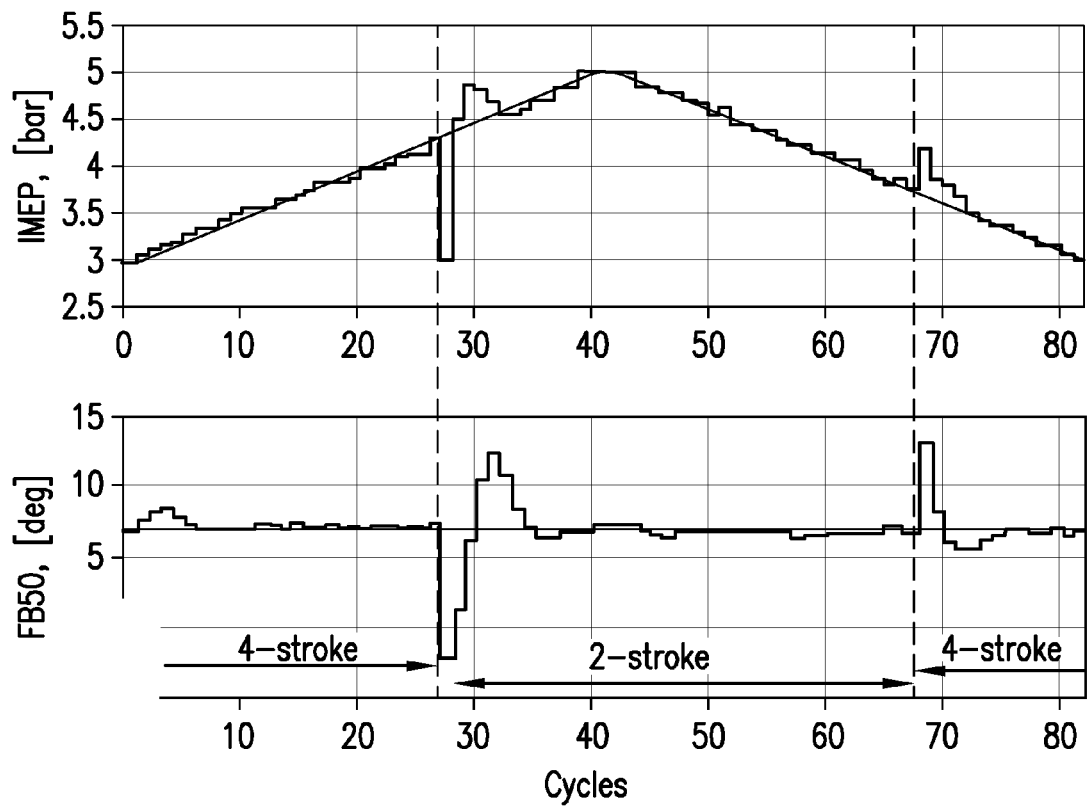
FIG. 1 shows HCCI engine tracking ramp reference signal in IMEP and constant reference (7 degree TDC) in combustion phasing with switching between 2-stroke and 4-stroke modes.

As shown in FIG. 1, switching between 2-stroke and 4-stroke modes results in oscillations in engine outputs, i.e., the IMEP (upper chart) and the combustion phasing (lower chart). As mentioned above, the engine is controlled so as to switch between the 2-stroke and the 4-stroke modes at the output in IMEP approximately equal to 4 bar. The combustion phasing in both the 2-stroke and the 4-stroke HCCI modes, as well as during switching, is regulated to 7 degrees TDC and is measured at a middle point of the combustion reaction (denoted in FIG. 1 as "MFB50"). The oscillations occur mainly due to differences in gas temperatures and concentrations of species inside engine cylinder between 2-stroke and 4-stroke modes for a given output. More particularly, in the switching from the 4-stroke to the 2-stroke mode, the first 2-stroke cycle following the last 4-stroke cycle is started with the initial conditions which differ from the initial conditions corresponding to the normal 2-stroke operation with the engine producing the same output. As a consequence, switching from the 4-stroke to the 2-stroke mode results in a drop in IMEP and combustion phasing. Similar analysis is applicable to the switching from the 2-stroke to the 4-stroke mode, which switching results in a jump in the IMEP and the combustion phasing.

Figure 2:
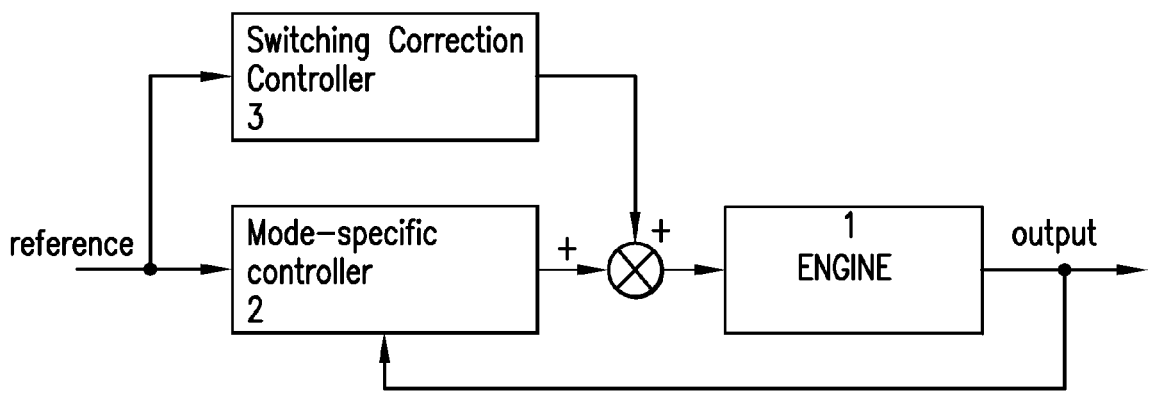
FIG. 2 shows a schematic block diagram illustrating an example embodiment of the control system according to the present invention.

The differences between the temperatures and concentrations resulting in "hard" switching can be treated as disturbances acting on the system during the first engine cycle after switching and influencing the following cycles. In order to insure a smooth transition between two modes, a correction is introduced to system inputs, i.e., valve timings, which facilitate elimination of the influence of these disturbances on the system outputs. In accordance with the present invention, it may be assumed that there exist two controllers, i.e., first mode-specific controller and a second mode-specific controller are provided to ensure satisfactory operation of the engine in the 2-stroke and the 4-stroke modes, so that each of the two operating modes has its own mode-specific controller which ensures good tracking of reference signals in IMEP and combustion phasing. These individual controllers are configured and tuned to ensure a desired performance of the engine working in one of the modes, but are not able to compensate for the disturbances introduced by switching between the two operating modes. When switching takes place, the inputs controlling the engine working at a specific mode are corrected with an additional signal provided by a switching correction controller 3. Correction takes place during several engine cycles after switching, until the influence of the switching disturbance on the engine output is completely eliminated and the mode-specific controller can provide a desired performance. The resulting control system incorporating the mode-specific controller 2 (one for each one of the 2-stroke mode and the 4-stroke mode; only one controller is shown in FIG. 2) and the switching correcting controller 3 (which is active after switching) is illustrated in FIG. 2. While the mode-specific controller 2 shown in FIG. 2 is closed in the feedback loop and the output depends on the output of the engine 1, the signal generated by the correcting controller depends only on the reference input. The correcting controller generates input sequence only during several cycles after switching and is inactive otherwise. Generation of the correction sequence is triggered by logic enforcing switching from one HCCI mode to another.

In order to determine the correction sequences which minimize the influence of the switching disturbance on the engine outputs, a method is provided in accordance with the present invention which combines techniques from the theory of system identification and the theory of optimal control. First, inputs are determined which show a significant influence on the engine outputs after switching. For each of the two modes, i.e., the 2-stroke and the 4-stroke modes, valve timings are determined which modify system outputs the most. Once the important engine inputs are defined, two linear engine system models are defined, one model for each mode. The models are calculated by running a system identification technique, i.e., applying excitation signals to the system, collecting the system response, and calculating the model based on the input-output data. For each of the two modes, one linear time-invariant state-space model is calculated using a subspace identification methodology. While collecting the data necessary for identification, the excitation inputs are applied to the engine controlled in the 2-stroke or the 4-stroke mode by a corresponding local controller. Hence, two linear engine system models represent not models of the engine operating at certain points, but models of two closed-loop systems in which the engine is controlled by respective controllers corresponding to the specific modes.

The two linear engine system models define mappings relating the initial conditions of the engine and engine inputs with the outputs of the engine. The switching point between the two modes of the HCCI operation defines the initial conditions of the first cycle after switching. Once the linear engine system model for a particular mode is calculated, the initial condition corresponding to a given switching point can be found by solving a least squares problem with an uncorrected engine response to switching to that mode. Once the initial condition corresponding to switching and the engine system model are determined, a desired system output is defined and the optimization problem of minimizing the cost function weighting the influence of the switching disturbance on the engine output is formulated. The minimum of the cost function is determined by solving a least squares problem, and the optimal input is determined—the correction sequence minimizing the influence of disturbance on the IMEP and the combustion phasing.

In accordance with the present invention, the inputs which have strong influence on the system response are defined first. In order to determine these inputs, two boundary engine cycles are first considered, i.e., the last cycle before switching and the first cycle after switching. FIG. 3 and FIG. 4 show charts of characteristic pressures for two boundary cycles: FIG. 3 for switching from 2-stroke to 4-stroke mode, and FIG. 4 for switching from 4-stroke to 2-stroke modes. The instants of the intake and exhaust valve openings and closings are also shown in FIGS. 3 and 4.

Instants of the intake valve closing (IVC) and the exhaust valve closing (EVC) indicated in FIG. 4 with double arrows are control inputs which may be used in order to influence the IMEP and the combustion phasing at the first 2-stroke cycle after switching. The inventors' experimental simulation results indicate that these two inputs have a strong influence on the considered system outputs, and hence IVC and EVC are chosen as the control inputs intended to correct for the switching disturbance. For correction in the first cycle of the 4-stroke mode, three variables may be used, i.e., the EVC, the intake valve opening (IVO), and the IVC. Two inputs, the EVC and the IVO, are often varied simultaneously in opposite directions as they effectively control EGR this way and influence the IMEP and the combustion phasing. The IVC is usually chosen to minimize the back flow from the cylinder into the intake manifold. The inventors' experimental simulation results indicate that the combination of EVC and IVO, which inputs are varied such that when one is advanced the other one is delayed by the same value (as shown in FIG. 3 with double arrows for EVC and IVO), significantly influence the engine outputs. Therefore, the EVC-IVO combination is chosen as the control inputs for the switching correction in 2-stroke to 4-stroke transition.

With the defined system inputs and outputs as described above, it is possible to formulate the identification problem, which is illustrated by the schematic block diagram of FIG. 5 exemplifying an identification structure for identifying system models. For each of the two operating modes, it is desired to find a linear discrete time-invariant model of the following form (1), $$x_m(k+1) = A_m x_m(k) + B_m u_m(k),$$

$$y_m(k) = C_m x_m(k) + D_m u_m(k), \qquad (1)$$

where k stands for the k-th engine cycle, and the subscript of the model variables indicate its relation to one of the modes, i.e., m=2 (2-stroke mode), and m=4 (4-stroke mode). For both operating-mode models, the output depends on the IMEP and the combustion phasing, i.e., $y_m(k) \in \mathbb{R}^2$ for m=2, 4. The identification inputs for two the modes exemplified by the block diagram in FIG. 5 are different, i.e., $u_2(k) \in \mathbb{R}^2$, and $u_4(k) \in \mathbb{R}^1$. Dimensions of states modeling the system, $x_m(k) \in \mathbb{R}^n$, are defined during the identification procedure. Note that the system output at the k-th engine cycle, $y_m(k)$, depends on both the system state and the inputs applied to the system at the current, k-th, cycle.

To identify the two linear engine system models, input sequences are first constructed which are sufficiently exciting and at the same time are representative of control signals utilized for tracking of IMEP and the combustion phasing. Square wave signals are used as the identification inputs. Period of the square waves is chosen to allow the system to stabilize to a new operating point after a new input is applied. In order to choose the order of the system model, the responses of the identified linear models are compared with the response of the engine. For both the 2-stroke and the 4-stroke linear models, the order n=2 exhibits very close matching between the responses.

With two linear engine system models corresponding to the 2-stroke mode and the 4-stroke mode, it is possible to express two relationships between the inputs of the engine used to correct for the switching disturbances and the outputs of the engine. In order to simplify the notation, the subscripts m defining assignment of variables in the equations (1) to one of two models is omitted in the following discussion. For each of the linear model (1), the following equation set (2) may be written:

$$y(0) = Cx(0) + Du(0),$$
$$y(1) = Cx(1) + Du(1) = CAx(0) + CBu(0) + Du(1),$$
$$y(2) = Cx(2) + Du(2)$$
$$= CA^2 x(0) + CABu(0) + CBu(1) + Du(2),$$
$$\vdots$$
$$y(N) = CA^N x(0) + \ldots + Du(N). \quad (2)$$

If the outputs y(k) and the inputs u(k) are collected to define the corresponding vectors $Y_N$ and $U_N$ as indicated below, $$Y_N = \begin{bmatrix} y(0) \\ y(1) \\ \vdots \\ y(N) \end{bmatrix},$$

$$U_N = \begin{bmatrix} u(0) \\ u(1) \\ \vdots \\ u(N) \end{bmatrix},$$

which vectors specify the output and the input of the system on the interval of N+1 samples (engine cycles), the equation set (2) may be rewritten compactly as equation (3), $$Y_N = A_x x(0) + A_u U_N, \quad (3)$$

where $$A_x = \begin{bmatrix} C \\ CA \\ CA^2 \\ \vdots \\ CA^N \end{bmatrix}, A_u = \begin{bmatrix} D & 0 & 0 & \ldots & 0 \\ CB & D & 0 & \ldots & 0 \\ CAB & CB & D & \ldots & 0 \\ \vdots & \vdots & \vdots & \ddots & \vdots \\ CA^{N-1}B & CA^{N-2}B & CA^{N-3}B & \ldots & D \end{bmatrix}.$$

Equation (3) describes a linear mapping between the initial condition of the system, x(0), the input, $U_N$, and the output, $Y_N$, during the first N+1 engine cycles. The initial condition x(0) describes, e.g., the disturbance introduced during switching from one mode to another and resulting from the mismatch between the temperatures and the concentrations of species in the engine cylinder. This initial condition depends on the point of switching between the two operating modes, and is equal to zero if the states of the engine working in one mode with certain output are identical to the states of the engine working in the other mode with the same output.

If the desired output of the engine after N+1 cycles after switching is known, $$Y_r = \begin{bmatrix} y_r(0) \\ y_r(1) \\ \vdots \\ y_r(N) \end{bmatrix},$$

an optimization problem of minimizing a quadratic cost function weighting the tracking error and system inputs may be formulated. The cost function may be defined as expression (4) below:

$$J = (Y_r - Y_N)' Q_y (Y_r - Y_N) + U_N' Q_u U_N. \quad (4)$$

In the above expression (4), $Q_y$ is a positive-definite matrix weighting the tracking error, $(Y_r - Y_N)$, and $Q_u$ is a positive-definite matrix weighting the system inputs, $U_N$. In order to be well-defined, the cost function J needs a component weighting the inputs, $U_N' Q_u U_N$. If this component is not present in J, the optimal input which minimizes the tracking error can grow unbounded. Since it is desired to find the input $U_N$ which minimizes J, the above expression (4) is expanded using the equation (3), i.e., $$J = (Y_r - A_x x(0) - A_u U_N)' Q_y (Y_r - A_x x(0) - A_u U_N) + U_N' Q_u U_N.$$

Next, the partial derivative of the quadratic cost function is taken with respect to the input, $U_N$, and the partial derivative is equated to zero to find the minimum:

$$\frac{\partial J}{\partial U_N} = A_u' Q_y A_u U_N + Q_u U_N - A_u' Q_y (Y_r - A_x x(0)) = 0.$$

The least squares solution is calculated to find the optimal input:

$$U^* = (A_u' Q_y A_u + Q_u)^{-1} A_u' Q_y (Y_r - A_x x(0)). \quad (5)$$

$U^*$ minimizes the cost function (4) for a given initial condition x(0) and the reference output $Y_r$. Inverse of the matrix $(A_u' Q_y A_u + Q_u)$ is well-defined because it is a sum of two matrices, i.e., a positive-definite $Q_u$ and a positive-semidefinite $A_u' Q_y A_u$. In order to find $U^*$, it is necessary to know the desired engine output on the interval of N+1 cycles after switching and the initial condition, x(0), of the linear engine system model which corresponds to a certain switching point for the 2-stroke or the 4-stroke mode. In the following description, an example method of calculating the initial condition corresponding to a given switching point between the operating modes is provided. It is assumed that an engine designer specifies the point of switching between the two operating modes. If there is more than one switching point, then the initial conditions may be calculated for all required points and specify a look-up table which defines mappings between the desired switching points and the corresponding initial conditions for the linear models. There should be two such tables, one table for each linear system corresponding to switching to the 2-stroke mode or switching to the 4-stroke mode.

To find the initial condition, x(0), of the linear model, a new identification process is executed. This identification process consists of recording the output of the engine after a "hard" switching, i.e., when no correction aimed at eliminating the after-switching fluctuations of the output is applied. It is necessary to record the system output over a sufficiently long time period to allow the system to completely react to the disturbance introduced by the switching. If it is assumed that the output is recorded during M+1 engine cycles after switching, then using the linear engine system model (1) with no inputs, the following expression (6) may be written:

$$Y_M = A_M x(0), \quad (6)$$

where $$Y_M = \begin{bmatrix} y(0) \\ y(1) \\ \vdots \\ y(M) \end{bmatrix},$$

is the collected output vector, and $$A_M = \begin{bmatrix} C \\ CA \\ CA^2 \\ \vdots \\ CA^M \end{bmatrix}.$$

If the pair of matrices A, C, from the linear engine system model is observable and the output $Y_M$ is recorded on a sufficiently long interval, $M \geq n-1$, (n is the order of the linear model), then the initial condition which corresponds to the recorded system response may be determined. The initial condition is calculated from the least squares solution of equation (6) for x(0), $$x_0 = (A_M' A_M)^{-1} A_M' Y_M. \quad (7)$$

Inverse of the above expression is well-defined due to observability of the matrix pair and the sufficiently large M Observability of the pair A, C is guaranteed by the fact that these matrices are the result of the identification procedure described earlier. Hence, using equation (7), the initial conditions for two linear models and all required switching points may be determined.

To be able to calculate the optimal correction sequence U* using equation (5), it is necessary to know, in addition to the initial condition $x_0$ corresponding to a switching point, the desired engine output $Y_r$ on the interval of N+1 engine cycles after switching. If it is assumed that the mode-specific controllers are tuned to track the desired reference signals in each mode, and the optimal correction sequence has to compensate only for the switching disturbance, then $Y_r$ can be assigned to zero on the whole N+1 interval. This simplification is a consequence of the separation of tasks between two mode-specific controllers represented in FIG. 2. The resulting equation (5) allows calculation of the correction sequences for switching between the two engine modes if the switching points are specified, e.g., by an engine designer.

FIG. 6 shows the results of applying the correction sequences calculated using the above-described method of the present invention to the nonlinear model of the HCCI engine, i.e., FIG. 6 shows the outputs of the engine during tracking of reference signals in IMEP and the combustion phasing identical to those in FIG. 1. As can be seen from FIG. 6, the introduced switching correction greatly improves the responses of engine to switching, e.g., oscillations in IMEP and the combustion phasing are greatly reduced. It is important to note that the responses can be improved further by the appropriate tuning of the correction sequences through the weighting matrices $Q_y$ and $Q_u$, in the above-described cost function (4). In addition, the correction sequences calculated using the above-described method of the present invention for switching from the 2-stroke to the 4-stroke mode was also applied to an experimental engine, the outputs of which experimental engine are shown in FIG. 7. For comparison purposes, both uncorrected and corrected outputs of the engine are shown in FIG. 7. As can be seen from FIG. 7, the correction sequences calculated using the above-described method of the present invention greatly improves the response of the engine.

What is claimed is:

1. A system for controlling oscillation in an engine output in a transition between a 2-stroke engine cycle mode and a 4-stroke engine cycle mode of a homogeneous charge compression ignition engine, comprising:
   a first controller for controlling engine operation in the 2-stroke engine cycle mode;
   a second controller for controlling engine operation in the 4-stroke engine cycle mode; and
   a switching correction controller for correcting engine operation in a transition between the 2-stroke engine cycle mode and the 4-stroke engine cycle mode, wherein the switching correction controller provides engine correction inputs for controlling oscillation in the engine output in the transition, the engine output being defined by integrated mean effective pressure (IMEP) and combustion phasing, and wherein the engine correction inputs are determined by:
   for each of the 2-stroke engine cycle mode and the 4-stroke engine cycle mode, determining valve timings which modify the engine output the most upon switching between the 2-stroke engine cycle mode and the 4-stroke engine cycle mode;
   for each of the 2-stroke engine cycle mode and the 4-stroke engine cycle mode, defining a linear engine system model at least partially based on the determined valve timings, wherein the linear engine system model provides mappings relating initial conditions of the engine and the engine correction inputs to outputs of the engine;
   determining initial conditions of the engine corresponding to a switching point for switching between the 2-stroke engine cycle mode and the 4-stroke engine cycle mode;

defining desired engine output conditions upon switching between the 2-stroke engine cycle mode and the 4-stroke engine cycle mode; and determining the engine correction inputs by using the determined initial conditions of the engine corresponding to the switching point, the desired engine output conditions, and the linear engine system model corresponding to the engine cycle mode in effect upon switching.

2. The method according to claim 1, wherein the initial conditions of the engine corresponding to a switching point for switching between the 2-stroke engine cycle mode and the 4-stroke engine cycle mode define disturbances in the engine output produced in the switching between the 2-stroke engine cycle mode and the 4-stroke engine cycle mode.

3. A method of controlling oscillation in an engine output in a transition between a 2-stroke engine cycle mode and a 4-stroke engine cycle mode of a homogeneous charge compression ignition engine, comprising:

providing engine correction inputs for controlling oscillation in the engine output in the transition, the engine output being defined by integrated mean effective pressure (IMEP) and combustion phasing, and wherein the engine correction inputs are determined by:

for each of the 2-stroke engine cycle mode and the 4-stroke engine cycle mode, determining valve timings which modify the engine output the most upon switching between the 2-stroke engine cycle mode and the 4-stroke engine cycle mode;

for each of the 2-stroke engine cycle mode and the 4-stroke engine cycle mode, defining a linear engine system model at least partially based on the determined valve timings, wherein the linear engine system model provides mappings relating initial conditions of the engine and the engine correction inputs to outputs of the engine;

determining initial conditions of the engine corresponding to a switching point for switching between the 2-stroke engine cycle mode and the 4-stroke engine cycle mode;

defining desired engine output conditions upon switching between the 2-stroke engine cycle mode and the 4-stroke engine cycle mode; and determining the engine correction inputs by using the determined initial conditions of the engine corresponding to the switching point, the desired engine output conditions, and the linear engine system model corresponding to the engine cycle mode in effect upon switching.

4. The system according to claim 3, wherein the initial conditions of the engine corresponding to a switching point for switching between the 2-stroke engine cycle mode and the 4-stroke engine cycle mode define disturbances in the engine output produced in the switching between the 2-stroke engine cycle mode and the 4-stroke engine cycle mode.

5. A computer-readable storage medium storing a computer program having a plurality of computer-executable codes which, when executed by a computer, performs a method of controlling oscillation in an engine output in a transition between a 2-stroke engine cycle mode and a 4-stroke engine cycle mode of a homogeneous charge compression ignition engine, the method comprising:

providing engine correction inputs for controlling oscillation in the engine output in the transition, the engine output being defined by integrated mean effective pressure (IMEP) and combustion phasing, and wherein the engine correction inputs are determined by:

for each of the 2-stroke engine cycle mode and the 4-stroke engine cycle mode, determining valve timings which modify the engine output the most upon switching between the 2-stroke engine cycle mode and the 4-stroke engine cycle mode;

for each of the 2-stroke engine cycle mode and the 4-stroke engine cycle mode, defining a linear engine system model at least partially based on the determined valve timings, wherein the linear engine system model provides mappings relating initial conditions of the engine and the engine correction inputs to outputs of the engine;

determining initial conditions of the engine corresponding to a switching point for switching between the 2-stroke engine cycle mode and the 4-stroke engine cycle mode;

defining desired engine output conditions upon switching between the 2-stroke engine cycle mode and the 4-stroke engine cycle mode; and determining the engine correction inputs by using the determined initial conditions of the engine corresponding to the switching point, the desired engine output conditions, and the linear engine system model corresponding to the engine cycle mode in effect upon switching.

6. The computer-readable storage medium according to claim 5, wherein the initial conditions of the engine corresponding to a switching point for switching between the 2-stroke engine cycle mode and the 4-stroke engine cycle mode define disturbances in the engine output produced in the switching between the 2-stroke engine cycle mode and the 4-stroke engine cycle mode.

\* \* \* \* \*